May 9, 1944.  A. B. KRAMER  2,348,482
HYDRAULIC CLUTCH
Filed Dec. 15, 1942  2 Sheets-Sheet 1
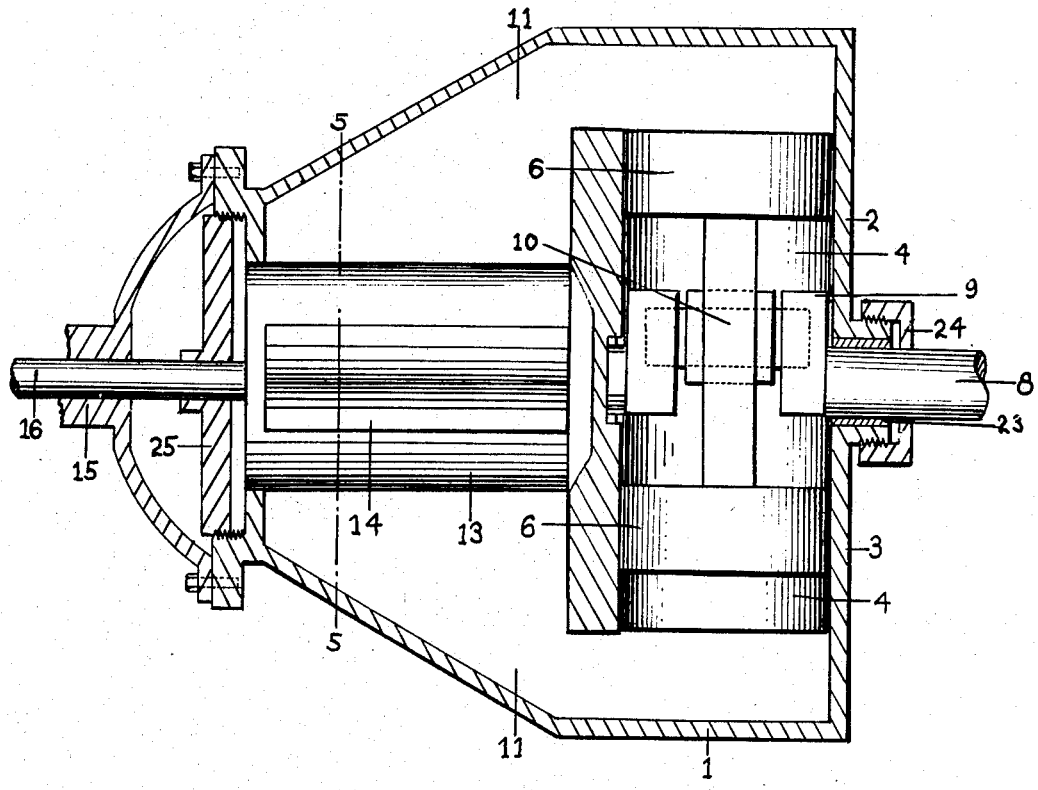
FIGURE I
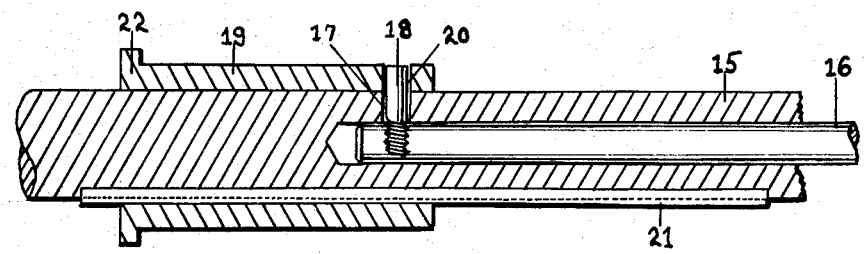
FIGURE II
ALBERT B. KRAMER
*INVENTOR.*
BY Norman N. Popper
ATTORNEY May 9, 1944.  A. B. KRAMER  2,348,482
HYDRAULIC CLUTCH
Filed Dec. 15, 1942  2 Sheets-Sheet 2
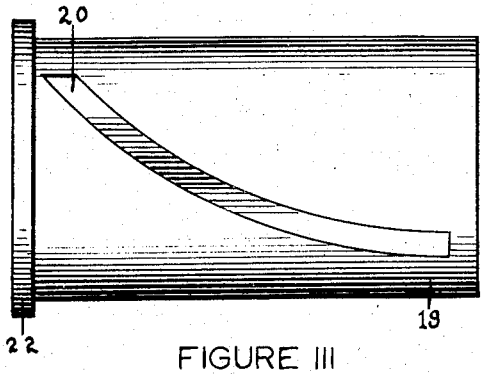
FIGURE III
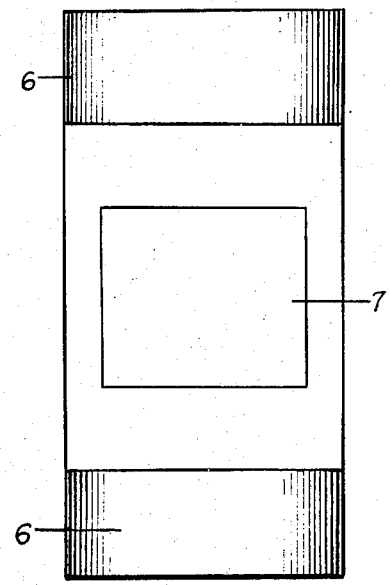
FIGURE IV
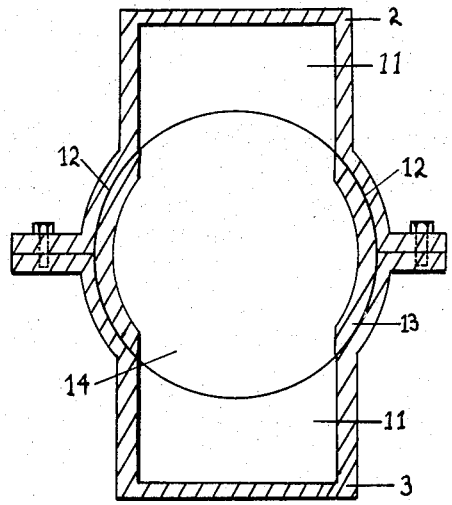
FIGURE V
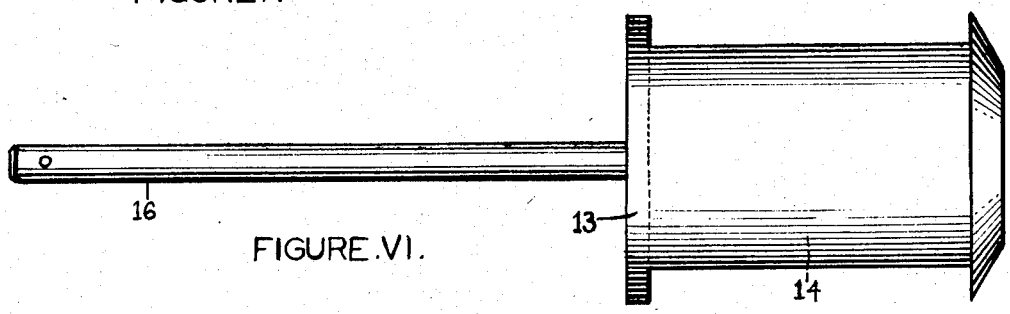
FIGURE VI
ALBERT B. KRAMER
INVENTOR.
BY Norman N. Popper
ATTORNEY.

Patented May 9, 1944

2,348,482

UNITED STATES PATENT OFFICE 2,348,482

HYDRAULIC CLUTCH

Albert B. Kramer, Newark, N. J.

Application December 15, 1942, Serial No. 469,057

4 Claims. (Cl. 192—60)

My invention relates to fluid clutches. Heretofore, such clutches have been exceedingly subject to leakage of the fluid contained; by reason of the simplification of form, much of the possibility of leakage is eliminated in my clutch. It has also been difficult to effect smooth and gradual control of power in clutches heretofore in use under different speed, temperature, and load; in the use of my clutch, increased viscosity of the fluid at low temperatures does not impair smoothness of operation, great power and speed is handled as easily as low power, and great loads are moved as easily as light ones. Many clutches heretofore in use have been subject to irregular operation by reason of the leakage of gaseous matter into the fluid passages; since no gaseous matter is included within the casing of my clutch, no gas leakage takes place from one part to another so smooth operation is assured. Some fluid clutches now in use are subject to a certain amount of "drag" because they are so designed and constructed as to impede the easy passage of the contained fluid through the various passageways in the clutch, whereby motion is imparted to the parts that are intended to remain stationary; this "drag" is eliminated in my clutch by providing ample space for the free and unimpeded motion of the contained fluid. It has also been found that the control mechanisms in fluid clutches hertofore in use have, by reason of complexity, permitted the leakage of the contained fluid at many points; in my clutch, the principle point at which maximum pressure is exerted at full load, is at such time merely subjected to normal pressure because the valve acts as a protecting dam. The mechanism which I have invented because of its ruggedness, acts as a substitute for complicated change speed mechanisms frequently found necessary incidental to the use of all kinds of powered devices and vehicles. The clutch may also be used as a dynamometer. Disc or similar clutches now in use are also subject to excessive heating and slipping under certain conditions of use; my clutch, however, while the contained fluid may be subject to changes in temperature during operation, is not subject to excessive heating and the amount of slippage may be completely minimized by the effective degree of closure of the valve. It is free from irregular operation, smooth in the transmission of power, and offers a continuously variable supply of power. It supplies a desirable cushioning effect between the driving and driven parts resulting in prolonged life for the entire mechanism in connection with which it is used. It is so readily adaptable from the standpoint of size that it may be used with large or small power units with high or low speed power units; it can be made very small where space is at a premium.

Referring now to the drawings:

Figure I is a vertical cross section of the casing of the hydraulic clutch with the valve closed;

Figure II is a vertical cross section of the driven shaft;

Figure III is a view of the control sleeve;

Figure IV is a view of the pistons;

Figure V is a cross section of the casing on the line 5—5 with the valve open; and Figure VI is a view of the valve.

Referring now to the numerals, the device consists of a casing 1 preferably formed of an upper part 2 and a lower part 3 which may be suitably fastened together. When these parts are fitted together as appears in Figure I and V, they have formed therein two cylinders 4, 4. A greater number of cylinders may be used, but two represent the preferred form. A piston 6, 6 operates in each of these cylinders. I prefer these pistons to be of unitary construction as shown in Figure I and IV. A square opening 7 is provided in the mid-part of the pistons 6, 6. A shaft 8 terminating in a crank 9 serves to actuate the pistons by means of a scotch yoke 10. Between the heads of the pistons, there runs a fluid passage 11. This passage is semicylindrical 12 at the horizontal center line. A rotatable valve 13 is positioned at this semicylindrical point so that when the opening 14 in the valve is vertical, any fluid in the passage may pass through that opening, but when the valve is horizontal, the opening will be closed by the semicylindrical portions 12 of the casing and the valve 13 and no fluid may flow through the passage. The passage 11 should at all points be of a cross section substantially greater than the area of the head of the piston, the purpose being to allow free movement of any contained fluid and to eliminate "drag." The passage is filled to the exclusion of all gaseous matter with a suitable fluid. An oil of proper viscosity and temperature stability may be used. Not only is the passage completely filled with fluid but also the space between the pistons is also filled with fluid. The end of the casing opposite to the side where the drivng shaft is rotatably positioned is now affixed to a hollow driven shaft 15. A valve stem 16 affixed to the valve aforesaid extends through the casing and also through the hollow of the driven shaft 15. The driven shaft has a small slot 17 extending from the hollow inner portion to the outer surface and about a quarter turn. In this slot, a pin 18 affixed to the valve stem extends through the driven shaft, and by the motion of this pin, a quarter turn of the valve itself may be effected. The driven shaft 15 has mounted thereon a sleeve 19. The sleeve has a diagonal cam-slot 20 therein which is engaged with the pin 19 of the valve stem. A feather-key 21 mounted on the driven shaft 15 serves to key the sleeve 19 to the revolving shaft, yet to permit it to slide horizontally along the said shaft. As a result, the pin 18 is moved from vertical to horizontal in the slot 17 by the cam-slot 20. The sleeve 19 is provided with a ring 22 whereby its position on the driven shaft may be controlled and, consequently, the position of the valve is incidentally controlled.

Where the driving shaft enters the casing, it is carried on a suitable bearing 23, and is similarly carried where it rests on the cylinder wall. A packing nut 24 serves to enclose that end. A large packing nut 25 serves to carry the valve stem 16 and enclose the opposite end of the casing.

The operation of the device is as follows. With the valve in open position as in Figure V and the driving shaft revolving, the pistons 6, 6 move up and down in the cylinders 4, 4 and the fluid merely moves back and forth in response to the reciprocating movements of the pistons. The sleeve 19 is then moved so that opening in the valve is more toward the closed position. This impedes the free movement of the fluid in the clutch so that the tendency of the pistons 6, 6 is to compress that fluid. But since the fluid is substantially incompressible, motion is imparted to the casing 1 and the driven shaft 15 begins to revolve. When the valve 13 is entirely closed (as in Figure I) by the sleeve 19 being moved, the cam-slot 20 moves the pin 18 which turns the valve stem 16 until the valve opening 14 is at closed position. Then the casing 1 will revolve and turn the driven shaft 15 in substantial conformity with the speed of the driving shaft 8. It will be noted that there are only two probable points of leakage—at the valve stem 16 and at the driving shaft 8. At the driving shaft, the only fluid that has access to that point is the fluid between the pistons and that is never at very great pressure so that the tendency toward leakage will be extremely slight. At the valve stem 16, the tendency toward leakage will be greatest when the full drive is being transmitted. At this time however, it is to be noted that the passage 11 is blocked by the valve 13 and the extent of the valve body up against the casing tends to minimize the possibility of leakage there. It will therefore be seen that the objects and advantages hereinbefore referred to, as well as many others, are achieved by my invention.

It is my intention that this specification and the drawings be considered as merely illustrative of my inventive concept, for many changes in the precise form here shown may be made, as well as the use of the various parts in combination or subcombination effected within the scope of the claims without departing from the spirit of my invention.

I claim:

1. A fluid clutch comprising a casing; cylinders disposed therein; opposed pistons reciprocating in the cylinders; a drive shaft operatively associated with the pistons; a fluid passage in the casing communicating between the heads of the pistons; fluid in the casing; a valve member mounted in the fluid passage, whereby the passage may be closed; a hollow driven shaft associated with the casing, a slot in the driven shaft; a valve stem for the valve member extending through the driven shaft; a pin associated with the valve stem and extending through the slot of the driven shaft; a sleeve with a diagonal cam-slot therein engaged with the pin of the valve stem, and carried by the driven shaft; and a feather key mounted on the driven shaft slideably engaging the sleeve.

2. A fluid clutch comprising a casing; cylinders disposed therein; opposed pistons reciprocating in the cylinders; a drive shaft operatively associated with the pistons; a fluid passage in the casing communicating between the heads of the pistons; fluid in the casing; a valve member rotatably mounted in the fluid passage, whereby the passage may be closed; a hollow driven shaft associated with the casing, a slot in the driven shaft; a valve stem for the valve member extending through the driven shaft; a pin associated with the valve stem and extending through the slot of the driven shaft; a sleeve with a diagonal cam-slot therein engaged with the pin of the valve stem, and carried by the driven shaft; and a feather key mounted on the driven shaft slideably engaging the sleeve.

3. A fluid clutch comprising a casing; cylinders disposed therein; opposed pistons reciprocating in the cylinders; a drive shaft operatively associated with the pistons; a fluid passage in the casing communicating between the heads of the pistons; fluid in the casing; a cylindrical valve member with a latitudinal passage therethrough rotatably positioned in the fluid passage; a hollow driven shaft associated with the casing, a slot in the driven shaft; a valve stem for the valve member extending through the driven shaft; a pin associated with the valve stem and extending through the slot of the driven shaft; a sleeve with a diagonal cam-slot therein engaged with the pin of the valve stem, and carried by the driven shaft; and a feather key mounted on the driven shaft slideably engaging the sleeve.

4. A fluid clutch comprising a casing; cylinders disposed therein; opposed pistons reciprocating in the cylinders; a drive shaft operatively associated with the pistons; a fluid passage in the casing communicating between the heads of the pistons; said fluid passage having a cross section not less in area than the head of the piston; fluid in the casing; a valve member mounted in the fluid passage, whereby the passage may be closed; a hollow driven shaft associated with the casing, a slot in the driven shaft; a valve stem for the valve member extending through the driven shaft; a pin associated with the valve stem and extending through the slot of the driven shaft; a sleeve with a diagonal cam-slot therein engaged with the pin of the valve stem, and carried by the driven shaft; and a feather key mounted on the driven shaft slideably engaging the sleeve.

ALBERT B. KRAMER.